March 10, 1970 H. WYLE 3,500,027
COMPUTER HAVING SUM OF PRODUCTS INSTRUCTION CAPABILITY
Filed Feb. 27, 1967 3 Sheets-Sheet 1

INVENTOR.
HENRY WYLE
BY
Robert D Rogers
ATTORNEY

INVENTOR.
HENRY WYLE

United States Patent Office 3,500,027
Patented Mar. 10, 1970

3,500,027
COMPUTER HAVING SUM OF PRODUCTS INSTRUCTION CAPABILITY
Henry Wyle, Garden Grove, Calif., assignor to North American Rockwell Corporation
Filed Feb. 27, 1967, Ser. No. 618,599
Int. Cl. G06f 15/06
U.S. Cl. 235—164                                4 Claims

ABSTRACT OF THE DISCLOSURE

A computer system for adding a plurality of computed multiplication products by replacing one function of the accumulator register with a separate register and logic during the computation of arithmetic products after a first product is computed and stored in the accumulator register of the computer. Each bit of a product being computed is added to the sum of previous products in the accumulator. As a result, when all the products have been computed, the sum is contained in the accumulation register.

BACKGROUND OF THE INVENTION

Field of the invention

The invention relates to a computer system using a separate register and logic during the successive computation of a plurality of products wherein each computed product is added to the sum of all previously computed products without the necessity for executing the separate operation of add and store after each multiplication.

Description of prior art

The sum of products is one of the most important types of computations performed by computers within a wide variety of applications. Conventional computers with a single address instruction format multiply by placing the multiplicand in the accumulator register. Afterwards, the multiplier is taken from memory and the two operands are multiplied. The product of the multiplication is added to previously computed products and the sum is stored.

If a sum of products, $AB+CD+ \ldots +YZ$, is to be computed in a conventional computer, as described, it is necessary therefore to separately compute each product and to separately add each product to the accumulation of the previous products. The accumulation of previous products is stored in memory during the formation of new products. As a result, each product of a sum of products computed requires the execution of four instructions, i.e. CLA, MPY, ADD, and STO. CLA is used to indicate that the accumulation register is cleared to zero and that a number in the computer memory is added to the contents of the accumulator. MPY means that the contents in the accumulator are multiplied by a number in memory. The instruction, ADD, means that the multiplied product is added to a stored accumulation of products. The last instruction, STO, means that the newly formed accumulation of products is stored in a memory location.

It is desirable to provide a system in which the number of instructions required per product of a sum of products is reduced. For example, if the instructions could be cut in half, the computational speed of each product of a sum of products would be increased.

Not only is the speed increased, but fewer instructions and therefore fewer memory locations are required. Studies have shown that for some typical aerospace applications, such a system could save on the order of 6% of the entire storage requirement for a comprehensive system of programs, involving one or several thousand words of storage. This advantage is in typical applications at least as important as the speed saving.

In some current-day computers having multiple accumulators, each product can be separately computed and left in its pair of accumulators without the necessity for storage in memory. However, the products must eventually be added to each other typically with an add (register to register) instruction per product. Specifically, the addition would be executed for each product after the first product. Thus, even in such computers a sum of products capability would eliminate one addition instruction per product.

If a computer having a "sum of products" capability could be provided with negligible increase in cost, not only would the computer's computational speed be increased for present applications, but it could also be used in performing additional functions requiring relatively fast computational time such as solutions of problems requiring extensive algebraic, geometric, trigonometric or other matrix manipulations.

SUMMARY OF THE INVENTION

Briefly, the invention comprises a sum of products computational system which eliminates the need for the ADD and STO instructions of a computational sequence. By eliminating the instructions, the number of instruction executions necessary, or required, for each product is cut in half. As a result, the computational speed of executing the sum of products instructions may be increased by as much as 40%. The system includes a fourth register means, for example, a quotient (Q) register, for achieving a sum of products capability.

In computing the sum of products (SPM) using one system embodiment, means are provided for initially multiplying one operand, for example, a multiplicand in a first register, by a second operand, for example, a multiplier, in a second register. The product is placed in an accumulation register. Thereafter, instead of first placing the multiplicand in the accumulator register and then transferring it to the first register, the multiplicand is placed in a separate register (Q). As a result, the contents of the accumulator register are not disturbed. Subsequently, the multiplicand is transferred to the first register and the multiplier is transferred to the second register. The operands are multiplied and as each successive bit of each partial product of each product is determined, it is added to the contents of the accumulator.

In a second system embodiment, register means are provided for computing a double length, and therefore more precise, product. After the initial multiplication cycle, instead of bringing a first multiply operand into an accumulator register, the first multiplier operand is brought into a separate register. The product of each multiplication cycle is added to the double length product contained in the double length accumulator register.

Logic is provided for repeating the computational cycles until all the products have been calculated and the sum of all the products is contained in the accumulator register.

Therefore, it is an object of this invention to provide an improved system, and process, for computing the sum of products.

It is another object of this invention to provide a multiple accumulator computer system for computing a sum of products.

It is a further object of this invention to provide a system for computing the sum of products at a relatively increased speed.

It is still a further object of this invention to provide an improved system for computing sums of products in which at least two computational instructions are omitted.

A still further object of this invention is to provide a system in which the quotient register and logic are used in computing the sum of products so that the accumulator contents need not be stored after each product is computed.

It is still a further object of this invention to provide a system and a process for using the quotient register and logic for computing the sum of products at an increase in speed.

These and other objects of this invention will become more apparent in connection with the following drawings.

DESCRIPTION OF THE PREFERRED EMBODIMENTS

Figure 1:
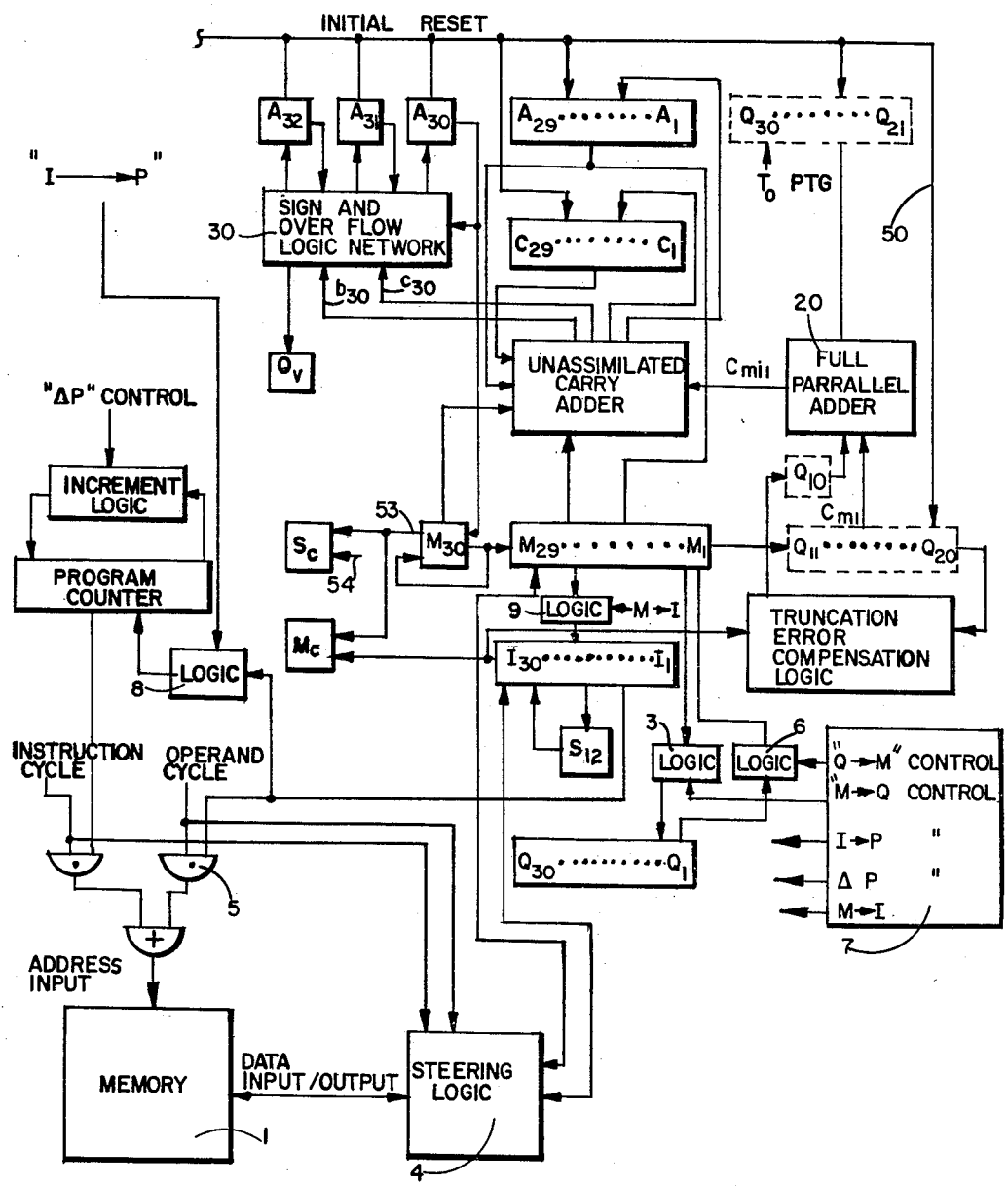
FIGURE 1 illustrates a block diagram of the arithmetic register and logic comprising the invention.

FIGURE 1 represents main memory 1 such as storage locations on a disc, drum, core or other recording devices. The system described herein may be applied equally to parallel and serially organized machines. The memory is connected to an M-register, $M_1$ through $M_{30}$. The M-register provides operand communication with the memory. Except for communications between the I-register and the memory, all information to the system illustrated passes in this period through the M-register.

The arithmetic unit contains an accumulator comprising an A-register, $A_1$ through $A_{32}$, a C-register, $C_1$ through $C_{29}$, and an unassimulated-carry adder 10. Also included in the arithmetic unit is the Q-register, $Q_1$ through $Q_{30}$. A portion of the Q-register, $Q_{10}$ through $Q_{30}$, is used during certain times to extend the capacity of the A-register and the M-register by 10 bits each.

An I-register, $I_1$ through $I_{30}$, is provided to receive instructions directly from memory. It is used in division operations and is time shared for both multiplication processes. That is, it is used to hold the multiplier operand bits during the initial multiplication cycle (MPY) and during the subsequent multiplication cycles (SPM). The I-register is connected to memory through steering logic 4 and to the M-register through logic 9, all of which may be comprised of standard gates well known to persons killed in the art. Logic 4, under the control of input signals for changing from an instruction to an operand cycle, gates information to and from the memory and the I and M-registers. Logic 5 is connected to the operand address bit positions of the I-register to indicate the operand address in the memory. I-register bits 21 through 27 indicate a logical configuration of "0101010" or SPM and a logical configuration of "0101000" for MPY. Decoding logic may be provided for generating the signals representing the two instructions. The I-register is also connected through logic 8 to the program counter for transferring the operand address field from the I-register to the Program Counter during certain program transfer operations.

The A-register holds the multiplicand before the first multiplication product is computed. After the initial cycle, the A-register holds the product. Subsequently, it holds the sum of products for all multiplication processes. The A-register is connected to the M-register for permitting transfer of data between the registers at the correct time during an operation.

The M-register holds the multiplicand during the execution of each multiplication instruction. As previously indicated, the M-register is also used for all data transfers to the A and Q registers from memory. Instructions are transferred directly to the I-register from memory. The M-register is connected to the memory, the Q-register, the A-register and the I-register. Logic 3 and 6, comprising standard gating circuits, interconnect the M and Q-registers. Logic portions 3, 4 and 6 may be mechanized similarly to the mechanization shown for logic 5.

During divisions, the Q-register is employed to develop a quotient. It is also employed during multiplication but in three independent parts. Portions $Q_{30}$ through $Q_{21}$ provide an extension for the accumulator. Portions $Q_{11}$ through $Q_{20}$ provide an extension for the M-register. Portion $Q_{10}$ is used as a buffer flip flop.

The primary use of the register, as described herein, is for temporarily holding the multiplicand operand after the initial multiplication instruction is executed. In other words, ordinarily the multiplicand operand is placed in the A-register before each multiplication. However, in the illustrated system, after the initial product is computed, it remains in the A-register and subsequently multiplicands are temporarily held in the Q-register. By the additional use of the I-register during multiplication, the Add and Store instructions required by conventional computers and as previously described, are eliminated.

The I-register, which receives the instructions for the system, is used to hold the multiplier in stages $I_1$ through $I_{29}$ during the multiplication of operands. During the multiplication, the multiplier is shifted to the left and to a control flip flop $M_c$, one bit at a time. The multiplication proceeds by the shift-add method starting with the most significant bit. The sign of the multiplier is transferred directly into a control flip flop $S_c$ instead of into $I_{30}$ at the initial interval of the multiplication cycle.

Certain portions of the FIGURE 1 system including sign and overflow logic network 30, full parallel adder 20, truncated error compensation logic 40, and various flip flops comprising $S_{12}$ and others, are not fully described herein. However, a description of the recited portions, as well as additional description including logic for a multiplication system with which the present invention can be used, is set forth in patent Ser. No. 3,290,493, issued Dec. 6, 1966, to Wyle et al., for a Truncated Parallel Multiplication System. To the extent practicable to do so, the major symbols and description for the patented invention are used in the description of the present invention. The primary difference between the two systems is the logical interconnection of the Q-register with logic which permits the Q-register to be used in the sum of products multiplication process.

Control logic 7 is connected to the logic portions of the system for regulating operation of the multiplication processes. The control logic provides timing signals as well as mode control signals. The signals control the time the contents of the Q-register is transferred into the M-register and vice versa; the instrumentation of the program counter; the duration of the instruction and operand cycles; and the setting of the program counter, with an address in the I-register for executing transfer instructions. In one embodiment the control logic may be mechanized by standard bit counter, control flip flops, and logic gates. Inputs SPM and MPY control the output signals, Q into M and M into Q.

Program counter (PC) is shown connected to the I-register through logic 8. It is incremented by one ($\Delta P$) each time an instruction is executed so that the next instruction is automatically placed into the instruction register during a subsequent cycle. The $\Delta P$ control signal is generated by control logic 7.

Figure 2:
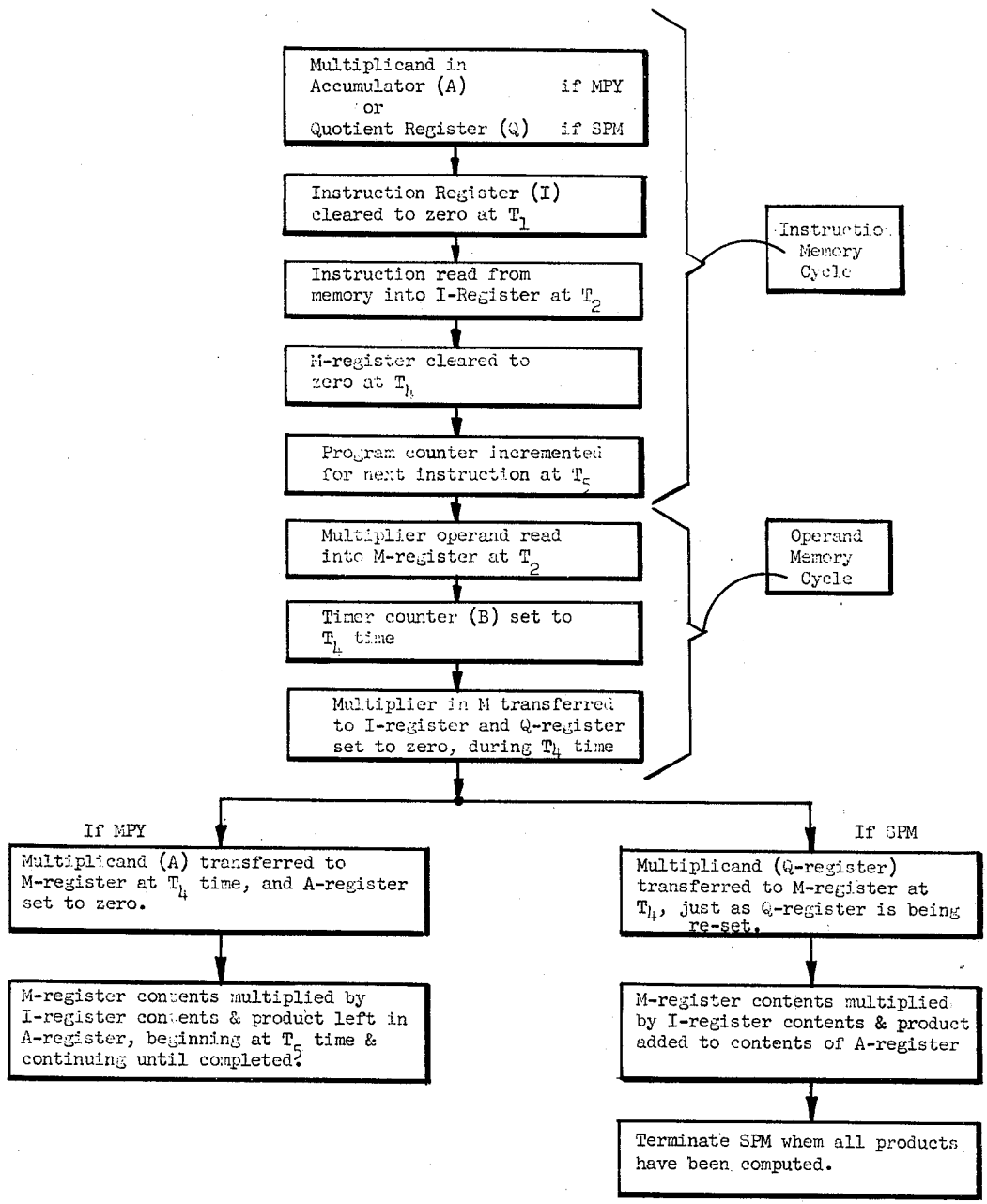
FIGURE 2 illustrates a flow diagram of the steps performed by the system in computing the sum of products.

FIGURE 2 shows a flow diagram of the various operations executed during the computation of a sum of products. In a practical application, the sum of products computation may be a branch or loop operation from a main program.

The multiplicand is loaded or placed into the A-register if the subsequent instruction is multiply (MPY) or into the quotient register (Q) if the subsequent instruction is a sum of products (SPM) instruction. After the A, or Q, register is loaded, the instruction memory cycle, or mode, is entered. The I register is cleared at $T_1$ time to zero and loaded at $T_2$ time with an instruction which includes the location of the multiplier to be loaded into the M-register.

The M-register is cleared to zero at $T_4$ time so that it can receive the multiplier during the next portion of the cycle. The program counter is incremented at $T_5$ time so that the next instruction will be entered into the I-register during the next instruction memory mode.

Following the instruction memory mode, the system enters the operand memory mode, or cycle. During $T_2$ of the operand memory cycle, the multiplier is read from memory into the M-register in accordance with the address previously loaded into the I-register. After the multiplier is in the M-register, the timer which comprises part of the control logic, is automatically re-set to $T_4$ of a simulated operand memory cycle and the multiplier is transferred from the M-register to the I-register at $T_4$ time. At the same time the Q-register is set to zero so that it can be used as previously described to extend the various other registers.

At the same time that the multiplier is transferred to the I-register, the multiplicand is transferred into the M-register. If the instruction in the I-register had been SPM the multiplicand would have been transferred from the Q-register into the M-register during the time the Q-register would be re-set.

A timing cycle for the instruction and operand modes comprises six intervals, $T_1$ through $T_6$.

After the operand memory cycle mode has been terminated, the multiplication cycle is entered. During the first cycle of a multiplication process, the M-register contents are multiplied by the I-register contents and the product is added to the contents of the A-register. During the initial multiplication cycle of a sum of products computation, since the A-register was zero, the product would be added to zero. Following execution of the MPY instruction, the A-register contents are not disturbed except for the addition of further partial products.

During the subsequent multiplication cycles, as previously indicated, the multiplicand is temporarily loaded into the Q-register instead of the A-register so that the initial product contained in the A-register is not required to be stored.

The M-register contents are multiplied by the I-register contents and the product is added to the previously computed products which are contained in the A-register. As a result, after each product is computed, that product plus the sum of previous products is placed in the A-register. The SPM cycle is repeated until all the products have been computed and the sum is placed in the A-register.

The multiplication process may be described in general terms. Assume that the multiplicand, X, and the multiplier, Y, are 30 bit binary numbers including sign, and that each is a fraction between $-1$ and $+1-E$, where E is equal to $2^{-29}$ and that the negative numbers are represented by the 2's complement. Then the multiplicand, multiplier and product may be expressed as follows:

$$X = -M_{30} + M_{29}2^{-1} + M_{28}2^{-2} + \ldots M_1 2^{-29}$$
$$Y = -I_{30} + I_{29}2^{-1} + I_{28}2^{-2} + \ldots I_1 2^{-29}$$
$$XY = -XI_{30} + XI_{29}2^{-1} + XI_{28}2^{-2} + \ldots XI_1 2^{-29}$$

From that it may be seen that multiplication may be performed by the shift-add method starting with the most significant multiplier digit with the following sequence of operation:

(1) Form $-XI_{30}$ by adding the 2's complement of the multiplicand after first setting the accumulator equal to zero, thereby effectively entering the 2's complement of the multiplicand in the accumulator if the sign $I_{30}$ of the multiplier (actually never stored in bit position $I_{30}$ but entered directly into the Sc and Mc control flip flop) is negative.

(2) Shift the multiplicand right one bit position to divide it by two and shift the multiplier to the left one bit position to enter the most significant multiplier digit in the control flip flop Mc.

(3) Add the multiplicand to the accumulator if the most significant multiplier digit $I_{29}$ is a bit one.

(4) Repeat steps 2 and 3 for each successively lower multiplier digits $I_{28}$ to $I_1$.

Thus, the first partial product will either be zero or the 2's complement of the multiplicand, depending upon whether the sign of the multiplier is positive (0) or negative (1). The necessity for adding the 2's complement when a negative multiplier is employed in the 2's complement form is explained at page 161 by R. K. Richards in "Arithmetic Operations in Digital Computers" published by D. Van Nostrand Company (1955).

Steps 2 and 3 are preformed simultaneously, during the same bit time by shifting the multiplicand into the right copying the sign into the vacated positions $M_{29}$, $M_{28}$ . . . from bit position $M_{30}$, as described in column 3 of the referenced patent. Examples and additional information describing the multiplication process can be found in the referenced patent.

Although FIGURE 1 illustrates a single accumulator machine, multi-accumulator machines, or general-register machines, represent more advanced computing systems. Such machines are particularly well-suited for implementing a double-precision sum of products instruction since the fourth arithmetic register required is already in the machine.

Figure 3:
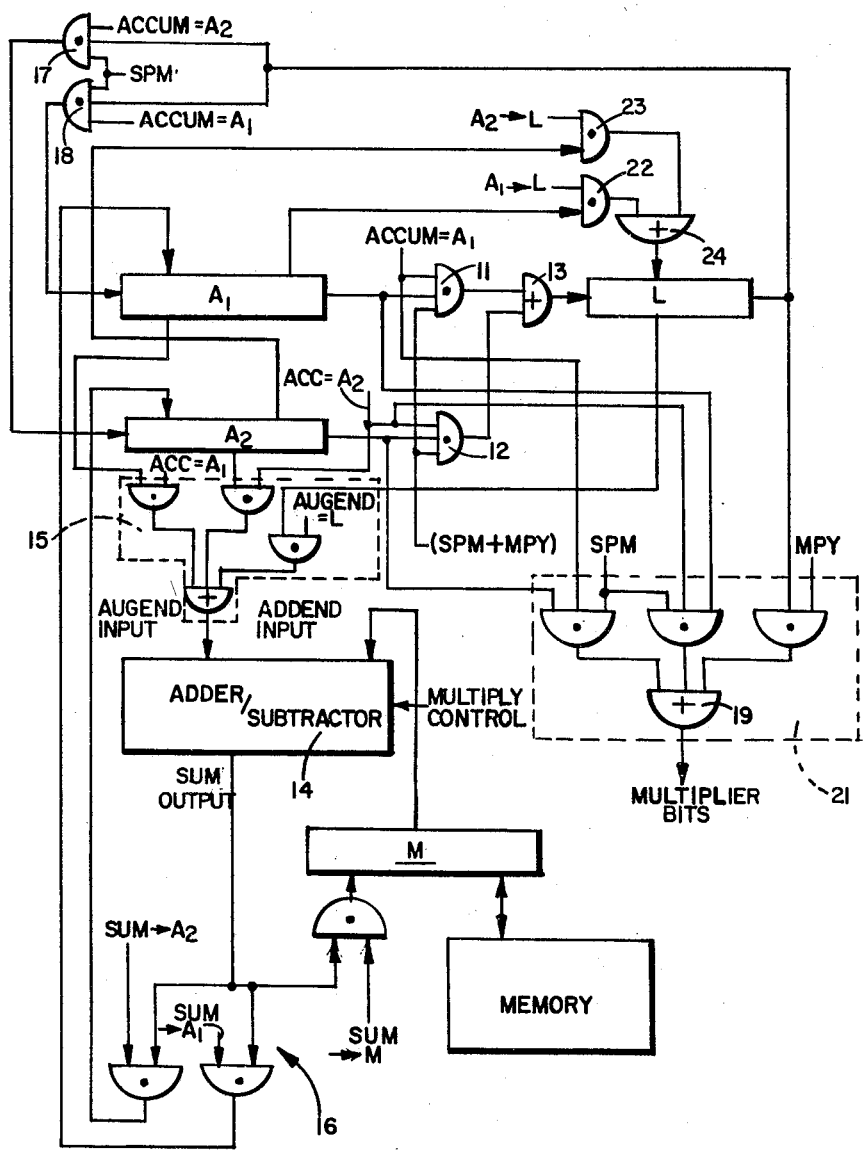
FIGURE 3 illustrates a block diagram of a two accumulator system for executing the sum of products instructions.

The basic logic blocks and an exemplary set of data paths that permit a two-accumulator machine to execute the sum of products instruction are shown in FIGURE 3.

The system comprises accumulator registers $A_1$ and $A_2$ connected to the L-register through gates 11, 12, 13, 22, 23 and 24. Although only two accumulator registers are illustrated, it should be obvious that more than two registers could be included in a general register machine. Data is transferred in parallel from either of the two registers into the L-register through gates 22, 23 and 24, depending on the presence or absence of control signals $A_2 \rightarrow L$ or $A_1 \rightarrow L$. Product bits generated during the multiplication cycles are shifted serially into the L-register through gates 11, 12 and 13 depending on the presence or absence of control signals (SPM or MPY) and either $Acc = A_1$ or $Acc = A_2$.

The L-register is connected to shift information into the A-registers through logic 17 and 18 under the control of control signals accumulator$=A_1$ or $=A_2$ and the SPM control signal. In addition, the L-register is connected to provide multiplier bits to gating logic 21. Multiplier bits may also be provided from either of registers $A_1$ or $A_2$. Control signals SPM, MPY, accumulator$=A_1$ or $=A_2$ determine which of the register contents comprise multiplier bits and which, therefore, are gated through OR gate 19 of logic 21. As is well known to those skilled in the art, multiplier bits determine whether or not the multiplicand is added to a previous sum of partial products of whether or not zero is added to the previous sum of partial products. Control logic for performing the function is not illustrated although it is well known to persons skilled in the art.

The $A_1$ and $A_2$ registers are also connected to adder-subtractor 14 through logic 15. In addition, the L-register is also connected to the adder-subtractor through logic 15. Depending on the presence of control signals accumulator$=A_1$ or $=A_2$, or augend$=$the L-register, the contents of one of the registers is gated into the adder-subtractor as the augend input. The adder-subtractor also includes an addend input from the M-register and an output connected to the $A_1$, $A_2$ registers, as well as the M-register. The adder-subtractor also comprises a multiply control input drive, from the multiplier bits which determines whether or not the multiplicand is added to a sum of partial products depending on the operation being executed. Information from the adder-subtractor is gated into the three registers mentioned through logic 16 into $A_1$, $A_2$ or M under the control of signals Sum $A_1$, Sum $A_2$ and Sum M. In certain cases, it is necessary to gate the sum into the M-register for being gated back into the memory to which the M-register is connected.

A means for generating the control signals is not shown, although the signals can be generated by means well known in the art as described in connection with FIGURE 1.

In ordinary multiplication of an operand initially in accumulator $A_1$, by an operand specified in the multiplication instruction, the contents of $A_1$ are regarded as the multiplier and are placed into the L-register through gate 22. The operand specified by the multiply instruction is simultaneously loaded from memory into the M-register and is considered as the multiplicand, and the $A_1$ register is re-set to zero after the transfer of its contents to L. Multiplication is initiated by adding the multiplicand in the M-register to the contents of $A_1$ under control of multiplier bits coming out of the right end of L. The augend bits pass through gates 25 of logic 15. To assure proper registration of the respective partial products, a double-precision right-shift of $A_1$ and L occurs after each addition. This produces the multiplier bit out of the right end of L for controlling the next addition of M to $A_1$, and it moves the least significant portion of the product one bit further into the L-register, through gates 11 and 13, as that bit is vacated by the most significant bit of the multiplier. After the entire multiplier bas been used up, a completed, double-precision product is contained in $A_1$ and L with the most significant half in $A_1$. During this process the previous contents of $A_1$, L and M are destroyed, but the previous contents of $A_2$ remain undisturbed. By substituting $A_2$ for $A_1$ and $A_1$ for $A_2$ in the above description, a multiplication of the other accumulator's contents by the word specified in the multiply instruction is seen to be possible.

The sum of products (SPM) instruction can be executed by the configuration of FIGURE 3. Assume that a product or sum of previous products is contained in the $A_1$ and L-registers as a double-precision number. Assume further that one of the two operands, for example the multiplier of the new product, is then loaded from memory via the M-register and the adder into $A_2$ by an ordinary load $A_2$ instruction. In effect, the $A_2$ register replaces the Q-register of the FIGURE 1 embodiment. The SPM instruction can then be fetched and executed. While the multiplicand operand defined in the SPM instruction is being loaded from memory into the M-register, the contents of $A_1$ and L are interchanged with $A_1$ going directly to L and L going to $A_1$ via the adder. Thus, the least significant half of the previous product is now in $A_1$ and the most significant half in L. The ordinary multiplication process can now begin, but with the multiplier bits being successively right-shifted out of the $A_2$ register instead of out of L, and with the bits coming out of the right-hand end of L being recirculated into the left-hand end of $A_1$. These bits are the successively higher order bits of the previous product. It should be noted that the transfer of the $A_1$ contents into L and the subsequent re-setting of $A_1$, which are the two principal preparatory steps to multiplication in an ordinary MPY instruction, have been omitted. After the entire multiplier has been used up, the new, completed, double-precision sum of products is contained in $A_1$ and L, with the most significant half in $A_1$. The previous contents of $A_2$ and M are destroyed, although $A_2$ could be saved simply by adding an end gate to recirculate its contents. By substituting $A_2$ for $A_1$ and $A_1$ for $A_2$ in the above description, it can be seen from the figure that either accumulator can perform either function.

This mechanization can be extended from the system of FIGURE 3, which had one pair of accumulators, to a system having $n$ pairs of accumulators, simply by always having the SPM instruction specify one accumulator as containing half of the previous sum of products and having the logic assume that the other accumulator of that accumulator pair contains the new multiplier. The mechanization can further be extended to the machine having a general register organization in the same way, since the general register machine differs from the multiple-accumulator machine chiefly in the fact that any of its general registers can be used as an accumulator, an index register, or a base register, as specified by the instruction. Since the SPM mechanization is unrelated to the address modification process, the general-register machine could use the same SPM mechanization as the multiple-accumulator machine.

Although the invention has been described and illustrated in detail, it is to be understood that the same is by way of illustration and example only, and is not to be taken by way of limitation; the spirit and scope of this invention being limited only by the terms of the appended claims.

I claim:

1. A system for computing the sum of a plurality of arithmetic products comprising, first means for multiplying first and second digital operands each representing a complete digital number, said first means including at least a first register for holding the product of said operands, second means for multiplying additional digital operands each representing complete digital numbers, said second means including means for adding the product of the operands to the product contained in the first register means, means for terminating the multiplying operation after a plurality of said additional digital operands have been multiplied and the sum of all the multiplied products are contained in said first register, said first means further including means for initially placing the multiplicand operand of said first and second digital operands in said first register, second register means, third register means including means for transferring said multiplicand operand of said first and second digital operands into said second register means, third means for placing the multiplier operand of said first and second digital operands in said third register means, said second means comprising fourth register means for holding the multiplicand operand of said additional operands including fourth means for transferring said multiplicand operand into said second register. said third means being operative to multiply the multiplier operands of said additional operands in the third register by the multiplicand operand of said additional operands.

2. The combination as recited in claim 1, wherein said first means includes a double length register with the first half comprising a register and the second half comprising a second register, means for initially placing said first digital operand in the first half of the double length register, including means for transferring the first digital operand into the second half of said double length register, third register means including means for placing the second digital operand in said third register means, said second means including fourth register means for holding the first digital operand of said additional digital operands, means for multiplying the first digital operand in said fourth register means by the second digital operand in said third register means, said means for multiplying further including means for adding the product of the digital operand in said fourth register means and the digital operand in said third register means to the contents of said double length register after each multiplication cycle.

3. A system for computing the sum of a plurality of arithmetic products comprising,
  accumulator register means including first means for placing a multiplicand operand in said register,
  first and second register means including means for placing multiplier operands in said first register,
  second means for simultaneously transferring said multiplicand operand to said first register and the multiplier operand in said first register to said second register,
  third means for multiplying the operands in said first and second registers and for adding the product to any sum contained in said accumulator register,
  third register means including fourth means for placing multiplicand operands in said register after said accumulator register has received at least one product,
  said second means including means for transferring multiplicand operands from said third register into said first register while the multiplier operand in said first register is transferred into said second register, whereby the operands are multiplied and the product added to the previous computed products in the accumulator.

4. The combination as recited in claim 3, wherein a plurality of operands are multiplied by said third means and after each multiplication the product is added to the sum of previous products contained in said accumulator register.

References Cited

UNITED STATES PATENTS

| | | | |
|---|---|---|---|
| 3,161,764 | 12/1964 | Croy | 235—160 |
| 3,192,366 | 6/1965 | Cochran, et al. | 235—164 |
| 3,311,739 | 3/1967 | Aiken et al. | 235—164 |
| 3,319,057 | 5/1967 | Githens et al. | 235—164 |
| 3,290,493 | 12/1966 | Githens et al. | 235—164 |
| 3,407,290 | 10/1968 | Athrubin | 235—164 |

MALCOLM A. MORRISON, Primary Examiner

C. E. ATKINSON, Assistant Examiner

U.S. Cl. X.R.

235—156, 160